(12) United States Patent
Stoltz

(10) Patent No.: US 10,696,151 B2
(45) Date of Patent: Jun. 30, 2020

(54) TRANSMISSION SYSTEM FOR COMMERCIAL VEHICLE POWERTRAIN ELECTRIFICATION

(71) Applicant: Eaton Corporation, Cleveland, OH (US)

(72) Inventor: Thomas J. Stoltz, Allen Park, MI (US)

(73) Assignee: Eaton Corporation, Cleveland, OH (US)

( * ) Notice: Subject to any disclaimer, the term of this patent is extended or adjusted under 35 U.S.C. 154(b) by 120 days.

(21) Appl. No.: 15/970,328

(22) Filed: May 3, 2018

(65) Prior Publication Data

US 2018/0251019 A1 Sep. 6, 2018

Related U.S. Application Data

(63) Continuation of application No. PCT/US2016/060308, filed on Nov. 3, 2016.

(60) Provisional application No. 62/250,722, filed on Nov. 4, 2015.

(51) Int. Cl.
*B60K 6/48* (2007.10)
*F16H 3/093* (2006.01)
(Continued)

(52) U.S. Cl.
CPC ............... *B60K 6/48* (2013.01); *B60K 6/365* (2013.01); *B60K 6/387* (2013.01); *B60K 6/547* (2013.01);
(Continued)

(58) Field of Classification Search
CPC .................... B60K 2006/4816; F16H 3/093
See application file for complete search history.

(56) References Cited

U.S. PATENT DOCUMENTS 6,887,180 B2 * 5/2005 Pels .................. B60K 6/36
477/3
8,037,784 B2 * 10/2011 Raoul .................. B60K 6/40
74/330
(Continued)

FOREIGN PATENT DOCUMENTS

| DE | 4202083 A1 | 7/1993 |
|---|---|---|
| EP | 1199468 A2 | 4/2002 |
| EP | 2264334 A1 | 12/2010 |

OTHER PUBLICATIONS

European Search Report for EP Application No. 16 86 2958 dated Jun. 28, 2019.
(Continued)

Primary Examiner — Tisha D Lewis
(74) Attorney, Agent, or Firm — RMCK Law Group PLC

(57) ABSTRACT

A transmission system selectively coupled to an engine crankshaft of an internal combustion engine arranged on a vehicle includes a transmission, a motor generator, a master clutch and a controller. The transmission includes an input shaft, a mainshaft, an output shaft and a countershaft offset from the input shaft. The countershaft is drivably connected to the first input shaft and the mainshaft. The motor generator is selectively coupled to the countershaft. The master clutch includes a driving portion connected to the engine crankshaft and a driven portion coupled to the transmission input shaft and adapted to frictionally engage the driving portion between open and closed positions. The controller selectively operates the transmission system in a first operating mode that includes defueling the engine while the vehicle is moving based on vehicle operating conditions and routes rotational energy from the output shaft, through the countershaft and into the motor generator.

20 Claims, 5 Drawing Sheets

(51) Int. Cl.
  *B60K 6/365* (2007.10)
  *B60W 30/18* (2012.01)
  *B60K 6/547* (2007.10)
  *B60K 6/387* (2007.10)
  *B60W 30/19* (2012.01)
  *B60K 6/26* (2007.10)

(52) U.S. Cl.
  CPC ...... *B60W 30/18072* (2013.01); *B60W 30/19* (2013.01); *B60K 2006/268* (2013.01); *B60K 2006/4808* (2013.01); *B60K 2006/4816* (2013.01); *B60K 2006/4833* (2013.01); *B60W 2030/1809* (2013.01); *B60W 2520/10* (2013.01); *B60W 2552/15* (2020.02); *B60W 2556/50* (2020.02); *Y02T 10/626* (2013.01); *Y02T 10/6221* (2013.01)

(56) References Cited

U.S. PATENT DOCUMENTS

| | | | |
|---|---|---|---|
| 2002/0104397 A1 | 8/2002 | Bowen | |
| 2005/0101432 A1* | 5/2005 | Pels | B60W 20/30 477/5 |
| 2005/0139035 A1* | 6/2005 | Lee | B60K 6/36 74/661 |
| 2007/0265126 A1* | 11/2007 | Janson | B60K 6/387 475/5 |
| 2010/0114442 A1 | 5/2010 | Kadota | |
| 2010/0224429 A1* | 9/2010 | Akiyama | B60K 6/445 180/65.22 |
| 2011/0126652 A1 | 6/2011 | Genise et al. | |
| 2011/0198139 A1* | 8/2011 | Fuechtner | B60K 6/48 180/65.25 |
| 2011/0259145 A1* | 10/2011 | Hellenbroich | B60K 6/48 74/661 |
| 2011/0307153 A1 | 12/2011 | Razaznejad et al. | |
| 2013/0186235 A1* | 7/2013 | Morimoto | B60K 6/365 74/7 C |
| 2016/0052382 A1* | 2/2016 | Clark | B60K 6/26 477/5 |

OTHER PUBLICATIONS

International Search Report and Written Opinion for International Application No. PCT/US2016/060308 dated Feb. 15, 2017, 10 pages.

* cited by examiner

TRANSMISSION SYSTEM FOR COMMERCIAL VEHICLE POWERTRAIN ELECTRIFICATION

CROSS-REFERENCE TO RELATED APPLICATIONS

This application is a continuation of International Application No. PCT/US2016/060308 filed Nov. 3, 2016, which claims priority to U.S. Provisional Application No. 62/250,722 filed on Nov. 4, 2015. The disclosure of the above application is incorporated herein by reference.

FIELD

The present disclosure relates generally to a transmission system and related method for operating a motor generator coupled to a countershaft of the transmission system.

BACKGROUND

Automated mechanical transmission (AMT) systems for vehicle use are known in art. As is well known, an AMT includes a clutch and a collection of gears. The AMT performs gear shifts automatically. AMTs can be provided on many vehicles including line haul vehicles and large construction vehicles. Fuel economy regulations are driving the need for greater fuel efficiency in both line haul and vocational vehicles.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A transmission system selectively coupled to an engine crankshaft of an internal combustion engine arranged on a vehicle includes a transmission, a motor generator, a master clutch and a controller. The transmission includes an input shaft, a mainshaft, an output shaft and a countershaft offset from the input shaft. The countershaft is drivably connected to the first input shaft and the mainshaft. The motor generator is selectively coupled to the countershaft. The master clutch includes a driving portion connected to the engine crankshaft and a driven portion coupled to the transmission input shaft and adapted to frictionally engage the driving portion between open and closed positions. The controller selectively operates the transmission system in a first operating mode that includes defueling the engine while the vehicle is moving based on vehicle operating conditions and routes rotational energy from the output shaft, through the countershaft and into the motor generator.

According to additional features, the master clutch is in the open position in the first operating mode. A planetary gear set can be coupled between the countershaft and the motor generator. An integrated motor drive and converter can be electrically connected to the motor generator. The motor generator can be one of a 12-volt generator, 24-volt generator and a 48-volt generator.

In other features, the integrated motor drive and converter includes a three-phase inverter. A first battery can be electrically coupled to the integrated motor drive and converter. The first battery can be electrically coupled to vehicle accessories. The vehicle accessories can include at least one of a cooling system, an air compressor, and an electric power steering. The vehicle operating conditions comprise a signal from at least one of a global positioning system, a grade sensor and a vehicle speed sensor.

According to other features, the controller selectively and alternatively operates the transmission system in a second operating mode wherein the master clutch is in a closed position and the transmission is in neutral, the motor generator facilitating engine start. The controller can selectively and alternatively operate the transmission system in a third operating mode wherein the master clutch is in an open position and the transmission is in neutral. The controller can selectively and alternatively operate the transmission system in a fourth operating mode wherein the master clutch is in a closed position and the transmission is in gear, the motor generator charging a battery while the vehicle is cruising.

A control method for operating an automated manual transmission system in a vehicle having a fuel-controlled engine, a multiple-speed change-gear transmission having an input shaft, an output shaft and a countershaft, and a master clutch drivingly interposed between the engine and the input shaft of the transmission. The control method includes determining a vehicle operating condition. The master clutch can be disengaged and the engine defueled while the vehicle is moving based on the vehicle operating condition satisfying a threshold. A motor generator can be coupled to a countershaft of the transmission with rotational torque by the output shaft of the transmission in a first operating mode while the engine is defueled and the vehicle is moving.

According to other features, the vehicle operating condition includes a grade the vehicle is travelling along. The vehicle operating condition can further comprise a vehicle speed. The vehicle operating condition can be provided by a global positioning system (GPS). The vehicle battery can be charged while driving the motor generator through an integrated motor drive and converter. Power can be supplied to an electric power steering system of the vehicle with the battery while the engine is defueled.

According to additional features, the transmission system can be selectively and alternatively operated in a second operating mode wherein the master clutch is in a closed position and the transmission is in neutral, the motor generator facilitating engine start. The transmission system can be selectively and alternatively operated in a third operating mode wherein the master clutch is in an open position and the transmission is in neutral. The transmission system can be selectively and alternatively operated in a fourth operating mode wherein the master clutch is in a closed position and the transmission is in gear, the motor generator charging a battery while the vehicle is cruising.

A transmission system selectively coupled to an engine crankshaft of an internal combustion engine arranged on a vehicle according to another example of the present disclosure includes a transmission, an alternator, a master clutch and a controller. The transmission includes an input shaft, a mainshaft, an output shaft and a countershaft offset from the input shaft. The countershaft is drivably connected to the first input shaft and the mainshaft. The alternator is selectively coupled to the countershaft. The master clutch includes a driving portion connected to the engine crankshaft and a driven portion coupled to the transmission input shaft and adapted to frictionally engage the driving portion between open and closed positions. The controller selectively operates the transmission system in a first operating mode that includes defueling the engine while the vehicle is moving based on vehicle operating conditions and routes rotational energy from the output shaft, through the countershaft and into the alternator.

BRIEF DESCRIPTION OF THE DRAWINGS

The present disclosure will become more fully understood from the detailed description and the accompanying drawings, wherein.

DETAILED DESCRIPTION

As will become appreciated from the following discussion, the instant disclosure replaces a vehicle electrical system from a traditional "front end accessory drive" (FEAD) that drives accessory components such as the electrical charging system (alternator) and the compressor that drives the HVAC air conditioner. The vehicle electrical system according to the present disclosure is instead driven by the transmission countershaft. Such a configuration allows a new operating mode of coasting while the engine is off (Engine Off Coasting or EOC), while still providing electrical power by driving the charging system from the vehicle wheels while the engine is stopped (defueled) and the vehicle is still moving.

Figure 1:
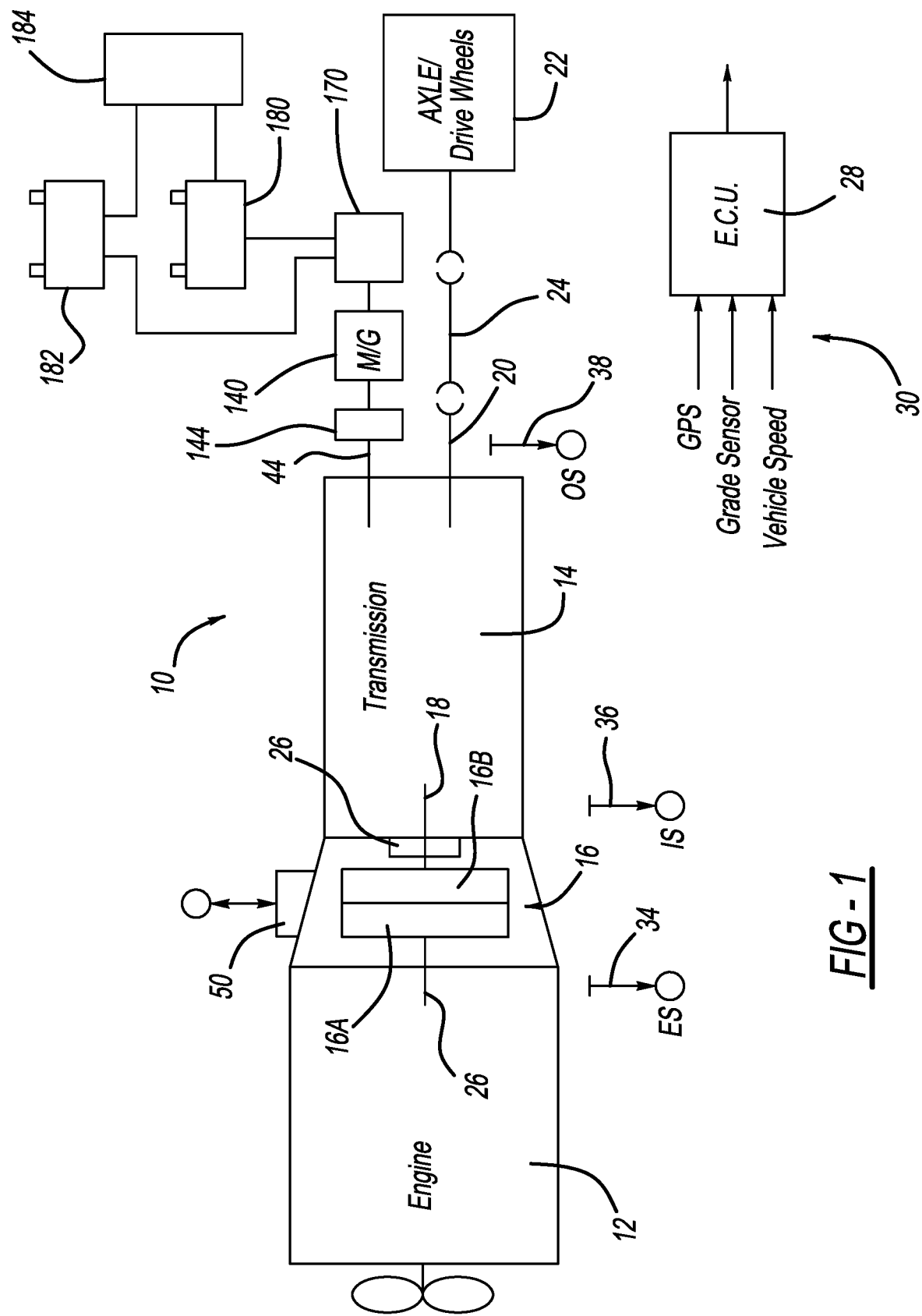
FIG. 1 is a schematic of an automated mechanical transmission system coupled to an engine, the transmission system having a motor generator coupled to a countershaft according to one example of the present disclosure.

With initial reference to FIG. 1, an AMT system constructed in accordance to one example of the present disclosure and referred to at reference 10. The AMT system 10 is selectively coupled to a fuel-controlled engine 12 (such as a diesel engine or the like), a multiple-speed, change-gear transmission 14 and a master clutch 16 drivingly interposed between the engine 12 and an input shaft 18 of the transmission 14. The transmission 14 may be of the compound type comprising a main transmission section connected in series with a splitter and/or range-type auxiliary section. Transmissions of this type, especially as used with heavy duty vehicles, typically have 9, 10, 12, 13, 16 or 18 forward speeds. A transmission output shaft 20 extends outwardly from the transmission 14 and is drivingly connected with vehicle drive axles 22, usually by means of a prop shaft 24.

The master clutch 16 includes a driving portion 16A connected to an engine crankshaft/flywheel 26 and a driven portion 16B coupled to the transmission input shaft 18 and adapted to frictionally engage the driving portion 16A. An electronic control unit (ECU) 28 is provided for receiving input signals 30 and for processing same in accordance with predetermined logic rules to issue command output signals 32 to the transmission system 10. The system 10 can also include a rotational speed sensor 34 for sensing rotational speed of the engine 12 and providing an output signal (ES) indicative thereof, a rotational speed sensor 36 for sensing the rotational speed of the input shaft 16 and providing an output signal (IS) indicative thereof, and a rotational speed sensor 38 for sensing the speed of the output shaft 20 and providing an output signal (OS) indicative thereof. The master clutch 16 may be controlled by a clutch actuator 50 responding to output signals from the ECU 28.

The transmission 14 has one or more mainshaft sections 40. The mainshaft 40 is coaxial with the input shaft 18. The transmission 14 has a first countershaft 42 and a second countershaft 44. The countershafts 42 and 44 are offset from the input shaft 18 and the mainshaft 40. The countershafts 42 and 44 are illustrated as being offset from one another, however in some examples the countershafts 42 and 44 may be coaxial with each other. The output shaft 20 may be coaxial with the mainshaft 40.

Figure 2:
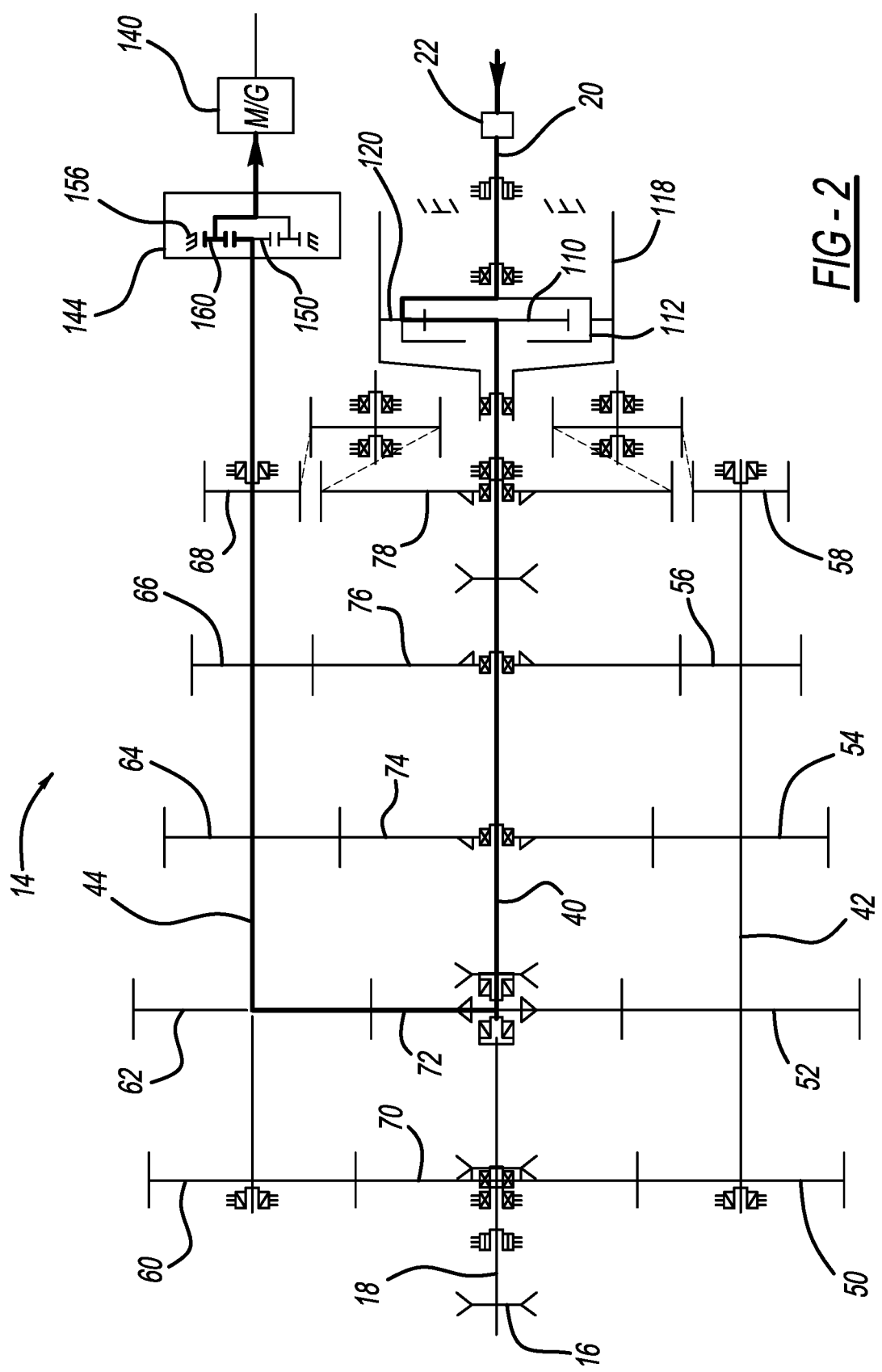
FIG. 2 is a schematic illustration of the automated mechanical transmission system of FIG. 1 and shown in a first mode of operation.

The first countershaft 42 is supported for rotation by the transmission 14 housing by bearings. The first countershaft 42 of the transmission 14 has countershaft gears 50, 52, 54, 56 and 58. The second countershaft 44 is supported for rotation by the transmission 14 housing by bearings. The second countershaft 44 of the transmission 14 has countershaft gears 60, 62, 64, 66 and 68. The mainshaft 40 of the transmission 14 has mainshaft gears 70, 72, 74, 76 and 78. The master clutch 16 can selectively communicate torque into the transmission 14. A headset clutch 84, a first sliding dog clutch 88 and a second sliding dog clutch 90 can move left and right as viewed in FIG. 2 to connect various mainshaft gears 70-78 and countershaft gears 50-58 and 60-68 for attaining a desired drive gear and torque path within the transmission 14.

The right hand end of the mainshaft 40 is drivably connected to a sun gear 110. A planetary carrier 112 is connected to or is integral with the output shaft 20, which is connected drivably through a drive axle 22 to vehicle traction wheels. A ring gear 118 engages planet pinions 120 carried by the carrier 112.

According to one example of the present disclosure, a motor generator 140 can be selectively coupled to the second countershaft 44 (or the transmission power take-off, PTO). As will become appreciated herein, the motor generator 140 is configured to run in two opposite modes. In a first mode, the motor generator 140 operates as a motor by consuming electricity to make mechanical power. In a second mode, the motor generator 140 operates as a generator by consuming mechanical power to produce electricity. In one configuration a planetary gear assembly 144 can be coupled between the second countershaft 44 and the motor generator 140. The planetary gear assembly 144 can be a speed up gear assembly having a sun gear 150. A planetary carrier 152 is connected to or integral with the second countershaft 44, which is connected drivably to the motor generator 140. A ring gear 156 engages planet pinions 160 carried by the carrier 152.

By way of example only the motor generator 140 can be a 6-20 Kilowatt, 24-48 volt motor. The motor generator 140 can be ultimately driven by the second countershaft 44 and be electrically connected to an integrated motor drive and converter 170. The integrated motor drive and converter 170 can provide voltage down conversion and battery management. In the non-limiting example provided, the integrated motor drive and converter 170 can be a 24-48 volt three-phase inverter. A first battery 180 can be electrically connected to the integrated motor drive and converter 170. A second battery 182 can be electrically connected to the integrated motor drive and converter 170. The first battery 180 can be a 24-48 volt battery that powers various battery powered components 184 of the vehicle such as hybrid cooling, heating ventilation and air conditioning (HVAC), an air compressor, power steering and other components. While the above description sets for 24 and 48 volt implementation, in other examples, the motor generator and related components can be configured for 12 volt operation. Further, in other examples, the transmission system 10 can incorporate an alternator in a generating only mode without the need for the integrated motor drive and converter 170. In the drawings, the feature 140 would be an alternator. It will be appreciated that the transmission system 10 can use only an alternator such that inertia brake and synchronization can be carried out given the second countershaft 44 is decelerating and not accelerating.

Various advantages can be realized by mounting the motor generator 140 to the countershaft 44 of the transmission 14. In one operating mode, as will be described in greater detail below, the engine can be turned off (defueled) while the vehicle is still moving or coasting (EOC) and the motor generator 140 is regenerating resulting in up to three percent fuel efficiency increase. In other advantages, the batteries 180 and/or 182 can be mounted in an engine compartment near the integrated motor drive and converter 170 reducing battery cable length over conventional mounting configurations. Moreover, various components may be eliminated with the transmission system 10 including, but not limited to a starter, an alternator, hydraulic power steering, synchronizers, and transmission inertia brake. In this regard, significant weight savings may be realized. In some arrangements, the transmission system 10 can be configured for use on vehicles with electric steering.

The controller 28 can operate the transmission system 10 in various operating modes. In a first mode, the controller 28 operates the master clutch 16 in an open condition with the transmission 14 in gear. In the first mode or EOC (FIG. 2), the controller 28 turns the engine 12 off or defuels the engine 12 while the vehicle is moving based on vehicle operating conditions and routes rotational energy from the output shaft 20, through the second countershaft 44 and into the motor generator 140. According to various examples, the vehicle operating conditions can include the input signals 30 related to at least one of a global positioning system (GPS) signal, a grade sensor signal and a vehicle speed sensor signal. As can be appreciated, it would be advantageous to run the transmission system 10 in the first mode when the vehicle is travelling down hill. Elevation changes can be attained from a GPS signal and/or a grade sensor for example. As used herein "grade" is used to denote an incline relative to horizontal that the vehicle is travelling along.

Figure 3:
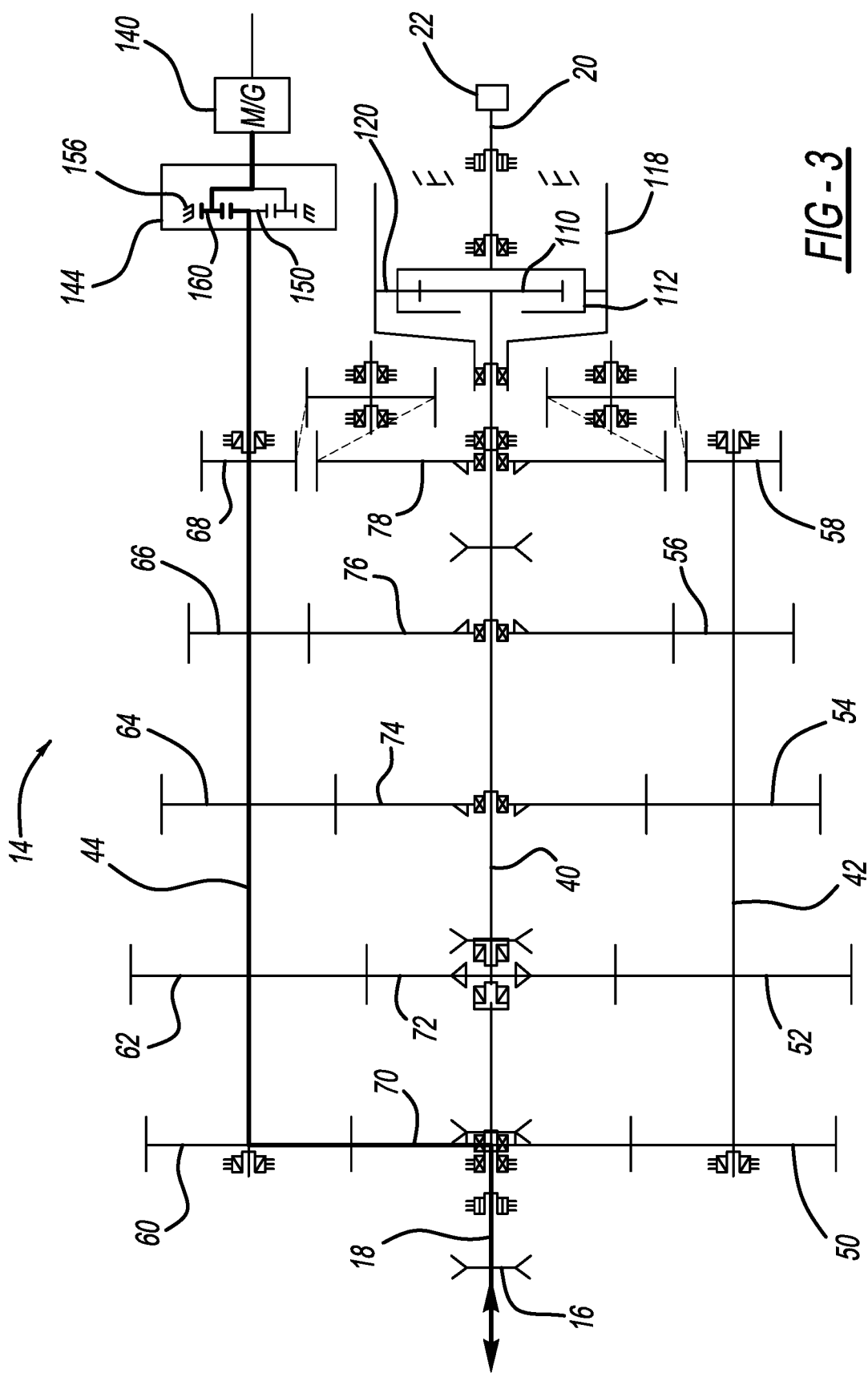
FIG. 3 is a schematic illustration of the automated mechanical transmission system of FIG. 1 and shown in a second mode of operation.
Figure 4:
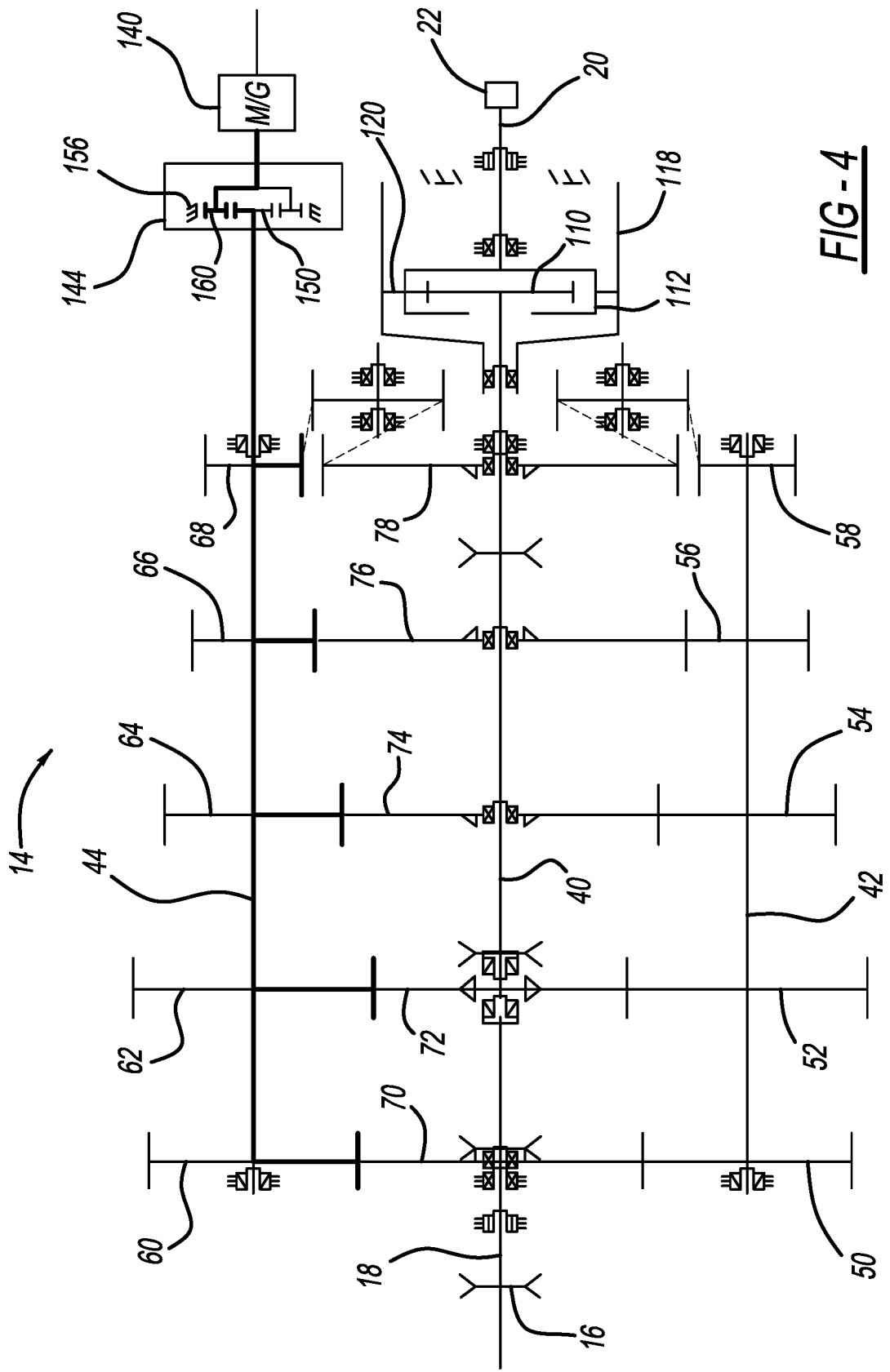
FIG. 4 is a schematic illustration of the automated mechanical transmission system of FIG. 1 and shown in a third mode of operation.
Figure 5:
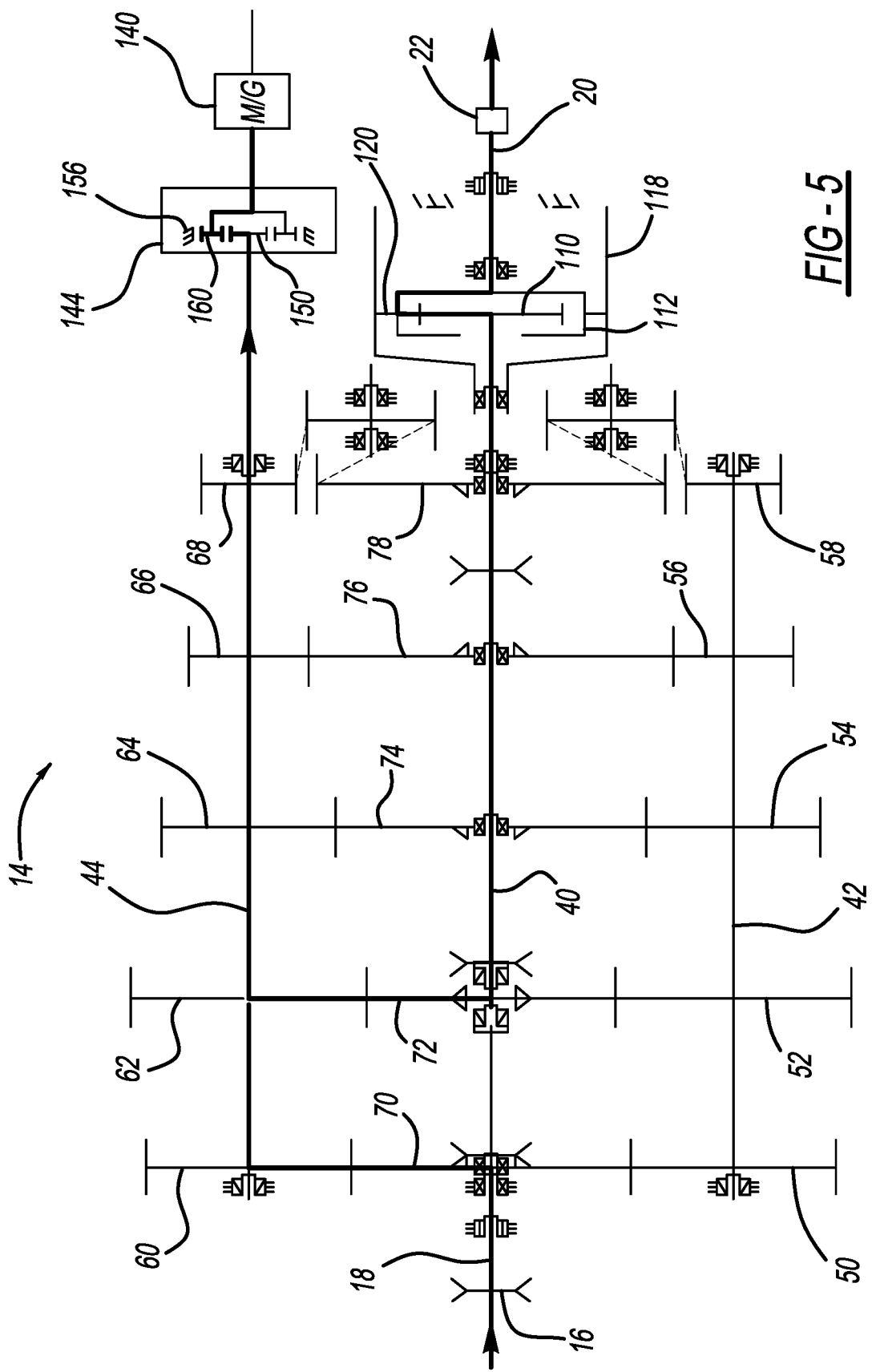
FIG. 5 is a schematic illustration of the automated mechanical transmission system of FIG. 1 and shown in a fourth mode of operation.

In a second mode (FIG. 3), the controller 28 operates the master clutch 16 in a closed condition with the transmission 14 in neutral. In the second mode, the controller 28 can facilitate engine start and idle generation. In this regard, the motor generator 140 can provide a rotational input into the engine to facilitate an engine start. In a third mode (FIG. 4), the controller 28 operates the master clutch 16 in an open condition and the transmission 14 in neutral. The third mode can be used for synchronization and inertia brake. In a fourth mode (FIG. 5), the controller 28 operates the master clutch 16 in a closed condition and the transmission 14 in gear. The fourth mode can be used for normal cruising and generation.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A transmission system selectively coupled to an engine crankshaft of an internal combustion engine arranged on a vehicle, the transmission system comprising:
   a transmission having an input shaft, a mainshaft, an output shaft and a countershaft offset from the input shaft, the countershaft drivably connected to the first input shaft and the mainshaft;
   a motor generator selectively coupled to the countershaft;
   a master clutch including a driving portion connected to the engine crankshaft and a driven portion coupled to the transmission input shaft and adapted to frictionally engage the driving portion between open and closed positions; and
   a controller that selectively and alternatively operates the transmission system in (i) a first operating mode that includes defueling the engine while the vehicle is moving based on vehicle operating conditions and routes rotational energy from the output shaft, through the countershaft and into the motor generator; (ii) in a second operating mode wherein the master clutch is in a closed position and the transmission is in neutral, the motor generator facilitating engine start; and (iii) in a third operating mode wherein the master clutch is in an open position and the transmission is in neutral.

2. The transmission system of claim 1 wherein the master clutch is in the open position in the first operating mode.

3. The transmission system of claim 1, further comprising a planetary gear set coupled between the countershaft and the motor generator.

4. The transmission system of claim 3, further comprising an integrated motor drive and converter that is electrically connected to the motor generator.

5. The transmission system of claim 4 wherein the motor generator is one of a 12 volt, 24 volt and 48 volt motor.

6. The transmission system of claim 4 wherein the integrated motor drive and converter includes a three-phase inverter.

7. The transmission system of claim 6, further comprising a first battery electrically coupled to the integrated motor drive and converter, the first battery electrically coupled to vehicle accessories.

8. The transmission system of claim 7 wherein the vehicle accessories comprise at least one of a cooling system, an air compressor, and an electric power steering system.

9. The transmission system of claim 1 wherein the vehicle operating conditions comprise a signal from at least one of a global positioning system, a grade sensor and a vehicle speed sensor.

10. The transmission system of claim 1 wherein the controller selectively and alternatively operates the transmission system in a fourth operating mode wherein the master clutch is in a closed position and the transmission is in gear, the motor generator charging a battery while the vehicle is cruising.

11. A control method for operating an automated manual transmission system in a vehicle having a fuel-controlled engine, a multiple-speed change-gear transmission having an input shaft, an output shaft and a countershaft, and a master clutch drivingly interposed between the engine and the input shaft of the transmission, the control method comprising:

determining a vehicle operating condition;
disengaging the master clutch and defueling the engine while the vehicle is moving based on the vehicle operating condition satisfying a threshold;
driving a motor generator coupled to a countershaft of the transmission with rotational torque provided by the output shaft of the transmission in a first operating mode while the engine is defueled and the vehicle is moving;
charging a vehicle battery while driving the motor generator through an integrated motor drive and converter; and
supplying power to an electric power steering system of the vehicle with the battery while the engine is defueled.

12. The control method of claim 11 wherein the vehicle operating condition is at least one of (i) a grade the vehicle is travelling along; (ii) a vehicle speed; and (iii) provided by a global positioning system (GPS).

13. The control method of claim 11, further comprising selectively and alternatively operating the transmission system in a second operating mode wherein the master clutch is in a closed position and the transmission is in neutral, the motor generator facilitating engine start.

14. The control method of claim 13, further comprising selectively and alternatively operating the transmission system in a third operating mode wherein the master clutch is in an open position and the transmission is in neutral.

15. The control method of claim 14, further comprising selectively and alternatively operating the transmission system in a fourth operating mode wherein the master clutch is in a closed position and the transmission is in gear, the motor generator charging a battery while the vehicle is cruising.

16. A control method for operating an automated manual transmission system in a vehicle having a fuel-controlled engine, a multiple-speed change-gear transmission having an input shaft, an output shaft and a countershaft, and a master clutch drivingly interposed between the engine and the input shaft of the transmission, the control method comprising:
determining a vehicle operating condition;
disengaging the master clutch and defueling the engine while the vehicle is moving based on the vehicle operating condition satisfying a threshold;
driving a motor generator coupled to a countershaft of the transmission with rotational torque provided by the output shaft of the transmission in a first operating mode while the engine is defueled and the vehicle is moving;
selectively and alternatively operating the transmission system in a second operating mode wherein the master clutch is in a closed position and the transmission is in neutral, the motor generator facilitating engine start; and
selectively and alternatively operating the transmission system in a third operating mode wherein the master clutch is in an open position and the transmission is in neutral.

17. The control method of claim 16 wherein the vehicle operating condition is at least one of (i) a grade the vehicle is travelling along; (ii) a vehicle speed; and (iii) provided by a global positioning system (GPS).

18. The control method of claim 16, further comprising:
charging a vehicle battery while driving the motor generator through an integrated motor drive and converter.

19. The control method of claim 16, further comprising:
supplying power to an electric power steering system of the vehicle with the battery while the engine is defueled.

20. The control method of claim 16, further comprising selectively and alternatively operating the transmission system in a fourth operating mode wherein the master clutch is in a closed position and the transmission is in gear, the motor generator charging a battery while the vehicle is cruising.

* * * * *